United States Patent [19]
McGhie et al.

[11] 4,453,734
[45] Jun. 12, 1984

[54] STEERABLE WHEEL SUSPENSION ASSEMBLY

[76] Inventors: James R. McGhie, 35 Ivybridge Dr., Brampton, Ontario, Canada; Semyon I. Fishgal, 1908-35 High Park Ave., Toronto, Ontario, Canada, M6P 2R6

[21] Appl. No.: 378,613
[22] Filed: May 17, 1982
[51] Int. Cl.³ .................. B60G 9/02; B60G 17/00
[52] U.S. Cl. ................... 280/662; 280/109; 280/691; 280/702
[58] Field of Search ............ 280/82, 83, 85, 109, 280/111, 691, 693, 690, 702, 703, 704, 662

[56] References Cited
U.S. PATENT DOCUMENTS

| | | | |
|---|---|---|---|
| 1,099,088 | 6/1914 | Hazard | 280/82 |
| 1,635,803 | 7/1927 | Sperry | 280/83 |
| 2,399,043 | 4/1946 | Klumb | 280/190 |
| 2,812,193 | 11/1957 | Grace | 280/405 R |
| 3,903,979 | 9/1975 | Perrotin | 180/140 |
| 4,186,814 | 2/1980 | Hart | 280/693 |

Primary Examiner—David M. Mitchell
Assistant Examiner—Kenneth R. Rice
Attorney, Agent, or Firm—Stanley E. Johnson; Richard J. Hicks

[57] ABSTRACT

A steerable suspension assembly for a vehicle comprising a fluid pressure cylinder adapted to be secured to a rigid frame portion of a vehicle and having a plunger reciprocally mounted therein and projecting downwardly therefrom. The plunger and cylinder are arranged co-axially with the plunger freely rotatable in the cylinder about such axis. A jacket is mounted on the cylinder for rotation about the axis thereof and interconnected with the plunger causing the collar and plunger to rotate in unison while allowing reciprocal movement of the plunger.

5 Claims, 7 Drawing Figures

STEERABLE WHEEL SUSPENSION ASSEMBLY

This invention relates to a steerable suspension assembly for a land vehicle.

Steerable suspension assemblies, of the general type to which the present invention relates, are disclosed in U.S. Pat. Nos. 2,812,193 issued Nov. 5th, 1957 and 3,903,979 issued Sept. 9th, 1975. The assemblies comprise generally a housing mounted rigidly on the frame of the vehicle, a fluid pressure suspension cylinder projecting downwardly from the housing with means on the lower end thereof for attaching thereto a ground engaging wheel assembly or assemblies and some form of turning device for adjusting or changing the direction of travel of the wheel relative to the vehicle on which it is mounted.

Although the above patent 2,812,193 has features similar to the present invention, the term "steerable" is not applicable to the interconnection of the suspension assembly by gear shafting as disclosed therein when considered with respect to high speed highway travel. The latter patent noted above accordingly is perhaps more applicable to the present invention in that it is designed for steering while driving from one site to another.

The principal disadvantages of the foregoing devices reside in subjecting their steerable member (the suspension cylinder in Patent 2,812,193 and a plate in Patent 3,903,979) to the thrust load of the suspension. Such construction requires thrust bearings and heavy steerable members and linkages.

A principal object of the present invention is to unload the steerable member and to simplify the construction of the assembly for mounting a wheel.

Applicant's objective is achieved by providing a cylinder that is open on the lower end when affixed to the vehicle and has a freely rotatable plunger reciprocally mounted in the cylinder with a free end projecting from the cylinder and to which a wheel unit or wheel units may be attached. A sleeve or jacket is freely rotatably mounted on the outer lateral surface of the cylinder with means being provided interconnecting the sleeve and the plunger to rotate the latter when the sleeve is rotated on the cylinder. A compressible fluid in the cylinder, or a non-compressible fluid operating in association with an accumulator, forms a cushion for loads applied to the ground wheel assembly. The fluid in the cylinder, acted upon by the plunger, not only cushions the load but also provides effectively a fluid end thrust bearing offering little resistance to rotation of the plunger when turning the wheel for steering.

In one embodiment of the invention the means interconnecting the rotatable jacket and the plunger for steering the wheel consists of at least one rod attached in some manner to a portion of the plunger projecting out of the cylinder and freely slidable through an aperture in the jacket or some form of separate sleeve means mounted thereon providing an aperture. Such construction effectively combines a slide way and coupling as one unit whereas the coaxial slide way of U.S. Pat. No. 3,903,979 is a separate expansion coupling in the form of a scissor linkage. Applicant's arrangement simplifies the construction. The device disclosed in U.S. Pat. No. 2,812,193 is similar to that disclosed in U.S. Pat. No. 3,903,979, in that it also utilizes a scissor type linkage.

In another embodiment, the means interconnecting the rotatable jacket and plunger for inter-related rotation about the axis of the plunger is a U-shaped leaf spring attached at one end to the jacket and at the other end to the plunger. In both embodiments the plunger and jacket rotate about a common axis and the means interconnecting the two is effectively an expansion coupling allowing the members to move axially relative to one another and at the same time interconnect them to rotate in unison about the common axis.

In order to accept radial loading the inner surface of the cylinder and/or the plunger can be provided with a radial bushing which may be provided with oil grooves, channels and the like means supplied with a working hydraulic fluid to form a hydrostatic cushion.

In keeping with the foregoing there is provided in accordance with the present invention:

a steerable suspension assembly for a vehicle comprising:

(a) a fluid pressure cylinder adapted to be secured to a rigid frame portion of a vehicle and project downwardly therefrom, said cylinder when projecting downwardly having an open lower end, (b) a plunger projecting into said cylinder in sealing relation through said open lower end of the cylinder and extending therebelow, said latter portion of the plunger being adapted to be connected to one or more wheels for rolling on the ground, said plunger and cylinder being arranged co-axially with said plunger being freely rotatable in the cylinder about their common axis, (c) a collar rotatably mounted on said cylinder, and (d) coupling means interconnecting said collar and plunger causing the same to rotate in unison about said common axis while allowing said plunger to move axially relative to the cylinder.

The invention is illustrated by way of example in the accompanying drawings wherein.

Figure 1:
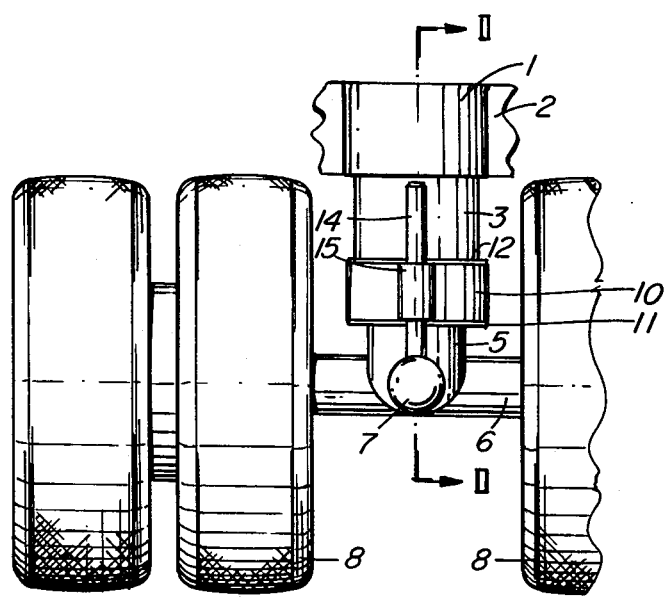
FIG. 1 is a front view of a steerable suspension assembly provided in accordance with the present invention.
Figure 2:
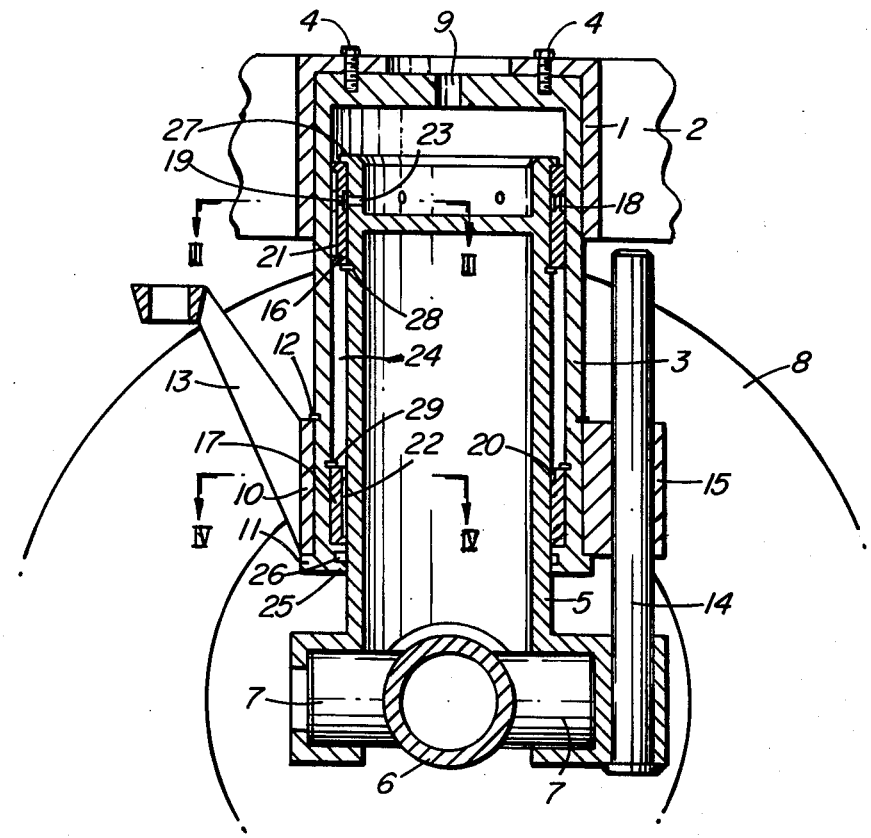
FIG. 2 is a sectional view taken along line II—II of FIG. 1.

Referring to the drawings, there is illustrated in FIGS. 1 and 2 a socket 1 secured as by welding to the frame 2 of a vehicle, socket 1 being open on the lower end thereof to receive an upper end portion of a fluid pressure cylinder 3. The open ended socket 1 may be part of the vehicle frame 2 or provided separately with applicant's suspension for attachment to a vehicle frame adapting the same for the suspension assembly provided in accordance with the present invention. The pressure cylinder 3 projects downwardly from the socket 1 and is fixed detachably or permanently thereto by conventional fastening means. Cylinder 3, for example, may be welded to the socket 1 or secured thereto by means of studs passing through the base plate of the socket and threaded into the end wall of the cylinder, two such studs being indicated at 4.

The cylinder 3 has a plunger 5 reciprocally mounted therein, plunger 5 being freely rotatable with respect to the longitudinal axis of the cylinder and having on the lower end means for attaching thereto the axle of a wheel assembly. In FIG. 1 there is illustrated two pairs of dual wheel units 8 journalled for rotation in a conventional manner on a common axle 6. A bearing shaft 5 secured to axle 6 and transverse thereto has bearing ends 7 journalled in suitable bearing means located adjacent the lower end of the plunger. Axle 6 accordingly, by the swinging joint, is permitted to oscillate about an axis which is perpendicular to the length of the plunger and in line with the direction of travel of the wheels.

For cushioning the wheel assemblies, plunger 5 acts against a compressible fluid contained in the cylinder 3 or alternatively, a hydraulic fluid connected to a variable fluid pressure source; for example, a hydraulic accumulator. When using hydraulic fluid the cylinder 3 is connected to a fluid pressure source, for example a hydraulic accumulator (not shown) by means of an outlet 9 in the end of the cylinder.

A jacket 10 is rotatably mounted on the outer surface of cylinder 3 adjacent the lower end thereof. The jacket 10 is located between a flange 11 projecting outwardly from the cylinder and a retaining ring 12, flange 11 and ring 12 preventing movement of the jacket 10 axially along the cylinder. Jacket 10 is provided with an arm 13 actuated by a vehicle steering system (not shown) by way of a link, hydraulic cylinder means or combinations thereof, all of which are conventional and form no part of the present invention.

The jacket 10, cylinder 3 and plunger 5 are concentrically disposed about a common axis and means are provided interconnecting the collar and plunger to rotate in unison about said common axis and at the same time permit movement one relative to the other along said axis. The means interconnecting the jacket 10 and plunger 5 is referred to herein as an expansion coupling with various different embodiments thereof being illustrated in the drawings. One embodiment of the expansion coupling is illustrated in FIGS. 1 and 2 and consists of at least one rod 14 secured to the plunger 5. The rod extends parallel to the plunger in spaced relation thereto and projects upwardly from the lower end of the plunger through a sleeve 15 fixedly secured to the jacket 10. Obviously the jacket 10 may be provided with an enlargement having a bore extending therethrough replacing the separate sleeve element 15. The rod 14 in this embodiment couples the collar with the plunger so as to rotate in unison about their common axis while at the same time provides a longitudinal slide way allowing movement of one relative to the other along the common axis. The slide way is also adapted to accept side loads.

Figure 3:
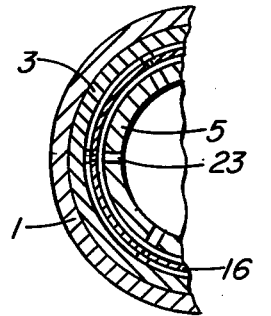
FIG. 3 is a sectional view taken along line III—III of FIG. 2.
Figure 4:
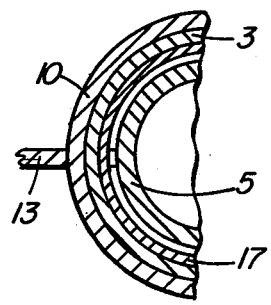
FIG. 4 is a sectional view taken along line IV—IV of FIG. 2.

In FIGS. 2-4, by way of illustration but not in a limiting sense, the cylinder 3 is shown pistonless, guided by way of radial bushings 16 and 17 respectively on the plunger and cylinder in spaced apart relation. The bushings are provided with oil grooves 18, 19 and 20 around the peripheral surface and axial channels 21 and 22 which are supplied with a working hydraulic fluid from the cylinder by way of openings 23 in a recessed upper end portion of the plunger and a cavity 24 between the plunger and the cylinder. The plunger is sealed in the cylinder cover 25 by means of a conventional seal 26. The bushings 16 and 17 provide a hydrostatic cushion to withstand side loads on the plunger 5. The bushing 16 abuts against a flange 27 on the upper end of the plunger and is retained on the plunger by a fastener 28 abutting against an opposite end of the seal. Similarly, seal 17 is retained within the cylinder 3 by the end cap 25 and a retaining ring means 29.

As an alternative to the foregoing seal arrangement, seals 16 and 17 can be replaced by a single seal or bearing between the plunger and the cylinder extending along considerable length of the plunger from the lower end of the cylinder toward the upper closed end. Hydraulic fluid in the cylinder is located not only at the end of the plunger but also therearound above seal 26. Such an arrangement is also often referred to as a pistonless hydraulic device.

Figure 6:
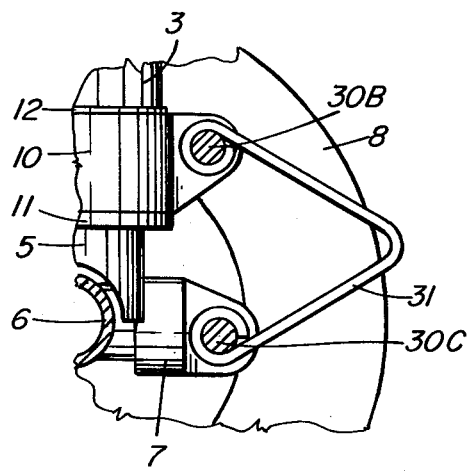
FIG. 6 is similar to FIG. 5 illustrating a further alternative to the embodiment illustrated in FIG. 5.
Figure 5:
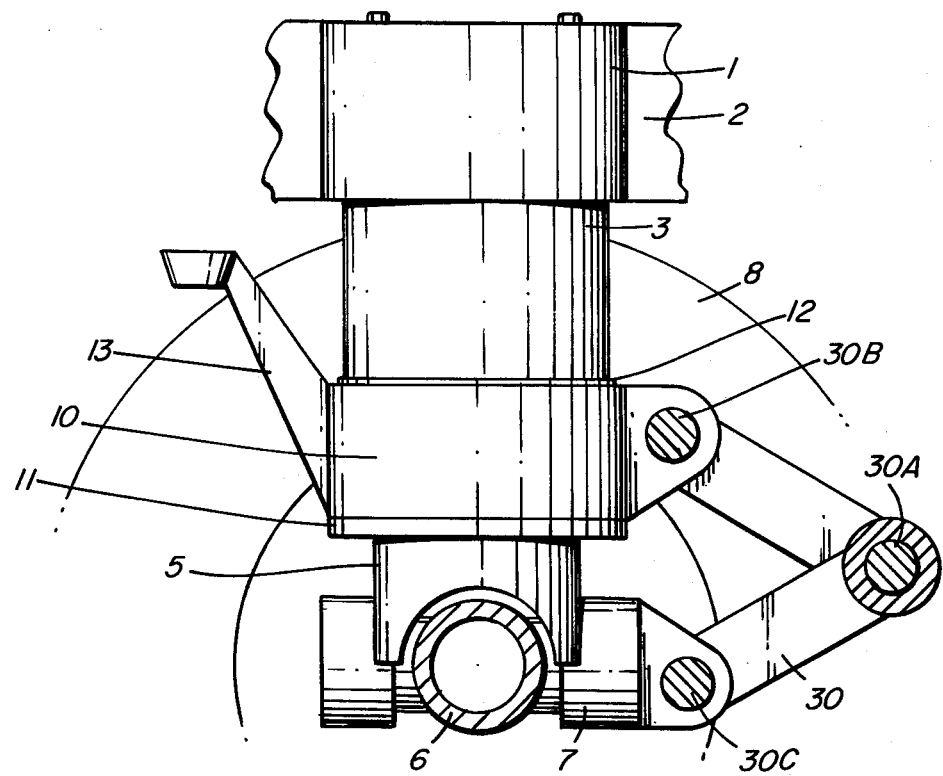
FIG. 5 is a side view illustrating an alternative embodiment of the one part of the device provided in accordance with the present invention.
Figure 7:
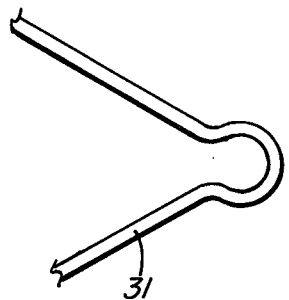
FIG. 7 illustrates another alternative to the embodiment illustrated in FIG. 6.

FIGS. 5 to 7 illustrate different embodiments interconnecting the collar 10 and plunger 5 allowing the same to move axially relative to one another and interconnect the same so as to rotate in unison. In the embodiment illustrated in FIG. 5 a pair of links 30 are pivotally interconnected by a pin 30A and pivotally connected at the free ends by pins 30B and 30C respectively to collar 10 and plunger 5. The coupling in FIG. 5 is similar to the arrangement illustrated in the above referred to U.S. Pat. Nos. 2,812,193 and 3,903,979, in which case radial bearings in cylinder 3 are required when heavy loads are involved.

In FIG. 6 a U-shaped leaf spring 31 is illustrated attached at opposite ends to collar 10 and plunger 5 respectively by pins 30B and 30C. In order to increase the flexibility of the spring a circular shape in the root of the U can be used as illustrated in FIG. 7.

In operation the plunger 5 is free to move in response to road shocks and compresses a compression medium (e.g gas in a hydraulic accumulator). This provides a cushion for the loads and forces encountered when travelling. When one or several hydraulic accumulators are used, several levels of suspension stiffness can be obtained by means of pre-calibrating to different given pressures or isolating one or several accumulators. This enables the suspension to be used in different conditions, for example, on highways and/or over land. The swinging coupling between the axle 6 and plunger 5 smoothes the rolling of the wheel. For turning, the arm 13 is moved by a steering system which is subjected essentially only to the resistance of the wheels to the turn, since the thrust component of the suspension transferred via the hydrostatic cushion does not create substantial resistance.

I claim:
1. A steerable suspension assembly for a vehicle comprising:
(a) a fluid pressure cylinder adapted to be secured to a rigid frame portion of a vehicle and project downwardly therefrom, said cylinder when projecting downwardly having an open lower end,
(b) a plunger projecting into said cylinder in sealing relation through said open lower end of the cylinder and extending therebelow, said latter portion of the plunger being adapted to be connected to one or more wheels for rolling on the ground, said plunger and cylinder being arranged co-axially with said plunger being freely rotatable in the cylinder about their common axis,
(c) a collar rotatably mounted on said cylinder and
(d) coupling means interconnecting said collar and plunger causing the same to rotate in unison about said common axis while allowing said plunger to move axially relative to the cylinder said coupling means comprising a U-shaped leaf spring pivotally attached at opposite ends respectively to said collar and plunger.

2. The assembly of claim 1 wherein said cylinder is provided with radial bushings for said plunger, said bushings being provided with oil grooves, and channels supplied with a working hydraulic fluid to form a hydrostatic cushion.

3. The assembly of claim 1, including means to pivotally mount the axle of a multiple wheel unit on said plunger permitting said axle to oscillate about an axis perpendicular to the axis of rotation of the plunger.

4. The assembly of claim 1, wherein fluid in said cylinder surrounds the portion of the plunger projecting thereinto.

5. The assembly of claim 1, including an arm secured to said collar and projecting therefrom to which a steering linkage for the vehicle may be attached.

* * * * *